United States Patent
Barry

(10) Patent No.: US 9,736,992 B1
(45) Date of Patent: Aug. 22, 2017

(54) FLORAL SUPPORT DEVICE FOR A TOMBSTONE

(71) Applicant: David Barry, New Ipswich, NH (US)

(72) Inventor: David Barry, New Ipswich, NH (US)

( * ) Notice: Subject to any disclaimer, the term of this patent is extended or adjusted under 35 U.S.C. 154(b) by 0 days.

(21) Appl. No.: 15/213,549

(22) Filed: Jul. 19, 2016

(51) Int. Cl.
*A47G 7/00* (2006.01)
*A01G 5/04* (2006.01)
*F16M 13/02* (2006.01)
*E04H 13/00* (2006.01)
*A47G 7/04* (2006.01)

(52) U.S. Cl.
CPC ............. *A01G 5/04* (2013.01); *A47G 7/044* (2013.01); *E04H 13/003* (2013.01); *F16M 13/022* (2013.01)

(58) Field of Classification Search
CPC ....................................................... A01G 5/04
USPC ........ 248/689, 690, 692, 27.8, 228.6, 230.6, 248/231.71, 251, 265, 269, 301, 304, 307, 248/339, 340, 215, 303; 47/41.01, 41.11
See application file for complete search history.

(56) References Cited

U.S. PATENT DOCUMENTS

| | | | | |
|---|---|---|---|---|
| 340,419 A * | 4/1886 | Clason | ............... | A47G 25/0607 248/304 |
| 597,967 A * | 1/1898 | Engstrom et. al. | .... | A47H 1/142 248/263 |
| 1,566,982 A * | 12/1925 | Shee | ...................... | A47G 7/044 248/214 |
| 2,583,237 A * | 1/1952 | Stegena | ................... | A45F 5/08 248/27.8 |
| 2,983,472 A | 5/1961 | Bowling | | |
| 3,145,847 A | 8/1964 | Clement | | |
| 3,204,908 A * | 9/1965 | Brown | ................... | A01K 97/00 248/228.6 |
| D204,552 S * | 4/1966 | Reynolds | ..................... | D11/143 |
| 3,310,911 A | 3/1967 | Boser | | |
| 4,039,136 A * | 8/1977 | DeHart | ............. | A47G 25/0607 248/215 |
| 4,083,457 A | 4/1978 | Dromboski | | |
| 4,387,873 A * | 6/1983 | Pavlo | .................. | A61M 5/1415 211/113 |
| 4,418,496 A * | 12/1983 | Koistinen | ................ | A01G 5/04 248/215 |
| 4,640,045 A | 2/1987 | Nesbitt | | |
| 4,887,785 A * | 12/1989 | Blaich | .................... | A01K 39/00 24/716 |
| D305,299 S | 1/1990 | Freeman | | |
| 5,450,690 A * | 9/1995 | Elsea | ....................... | A01G 5/04 220/476 |
| D363,689 S | 10/1995 | Vitalune | | |
| D376,558 S | 12/1996 | Elsea | | |
| 5,934,016 A * | 8/1999 | Jones | ....................... | A01G 5/02 119/74 |
| 6,168,125 B1 * | 1/2001 | Winger et al. | ......... | A47G 7/044 248/228.3 |

(Continued)

*Primary Examiner* — Terrell McKinnon
*Assistant Examiner* — Michael McDuffie

(57) ABSTRACT

The floral support device for a tombstone is adapted for use with a tombstone. The floral support device for a tombstone is adapted for use with a floral arrangement. The floral support device for a tombstone mounts directly on the tombstone. The floral arrangement is hung from the floral support device for a tombstone. The floral support device for a tombstone comprises a C clamp and a hook. The hook is attached to the C clamp. The C clamp attaches to the tombstone.

7 Claims, 3 Drawing Sheets

(56) References Cited

U.S. PATENT DOCUMENTS

| | | | | |
|---|---|---|---|---|
| 6,494,411 B1* | 12/2002 | Bjorklund | ............... | F16L 3/24 |
| | | | | 248/228.6 |
| 6,575,416 B1* | 6/2003 | Avinger | ............ | A47G 25/0614 |
| | | | | 248/215 |
| 7,992,833 B1* | 8/2011 | Goodman | .......... | A47G 25/0614 |
| | | | | 248/298.1 |
| 8,360,381 B2* | 1/2013 | Lee | ..................... | A47G 7/044 |
| | | | | 211/106.01 |
| 8,523,118 B2* | 9/2013 | Weder | ..................... | A01G 5/04 |
| | | | | 248/151 |
| 8,857,347 B1* | 10/2014 | Liu | ........................ | A47B 5/02 |
| | | | | 108/47 |
| 9,307,700 B1* | 4/2016 | Schmitt | .................. | G09F 17/00 |
| 2005/0246951 A1* | 11/2005 | Taylor | ................... | A47G 7/042 |
| | | | | 47/41.1 |
| 2006/0108498 A1* | 5/2006 | Jackson | .................. | G09F 7/18 |
| | | | | 248/690 |
| 2011/0036001 A1 | 2/2011 | Aker | | |
| 2015/0238027 A1* | 8/2015 | Yeh | ...................... | A47K 10/04 |
| | | | | 248/307 |

* cited by examiner

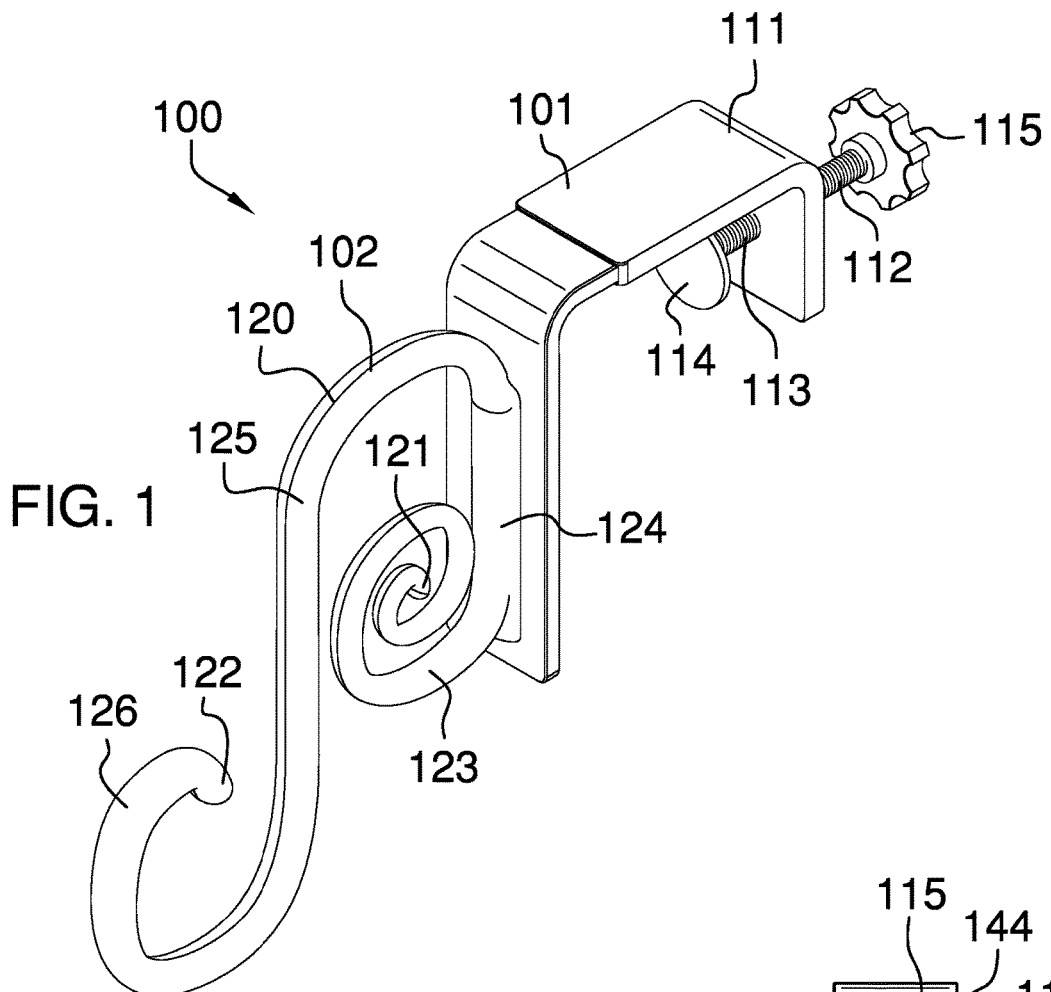
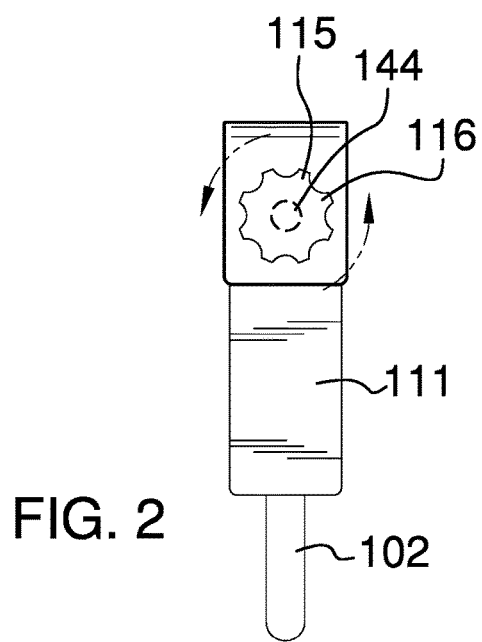

FLORAL SUPPORT DEVICE FOR A TOMBSTONE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of horticulture and agriculture, more specifically, a floral handler for wreaths or floral displays.

SUMMARY OF INVENTION

The floral support device for a tombstone is adapted for use with a tombstone. The floral support device for a tombstone is adapted for use with a floral arrangement. The floral support device for a tombstone mounts directly on the tombstone. The floral arrangement is hung from the floral support device for a tombstone.

These together with additional objects, features and advantages of the floral support device will be readily apparent to those of ordinary skill in the art upon reading the following illustrative, embodiments when taken in conjunction with the accompanying drawings.

In this respect, before explaining the current embodiments of the floral support device in detail, it is to be understood that the floral support device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the floral support device.

It is therefore important that the claims be regarded as including such equivalent construction insofar as they do not depart from the spirit and scope of the floral support device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 1 is a perspective view of an embodiment of the disclosure.

FIG. 2 is a back view of an embodiment of the disclosure.

DETAILED DESCRIPTION OF THE EMBODIMENT

Figure 3:
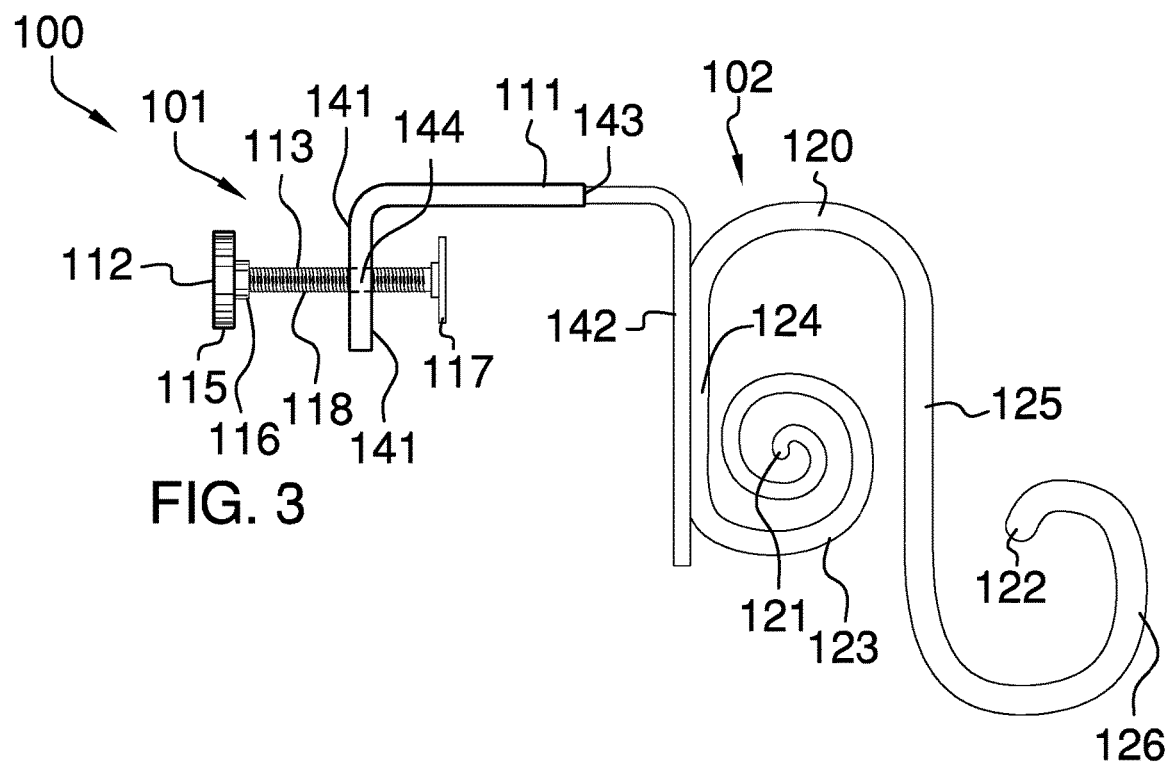
FIG. 3 is a side view of an embodiment of the disclosure.
Figure 4:
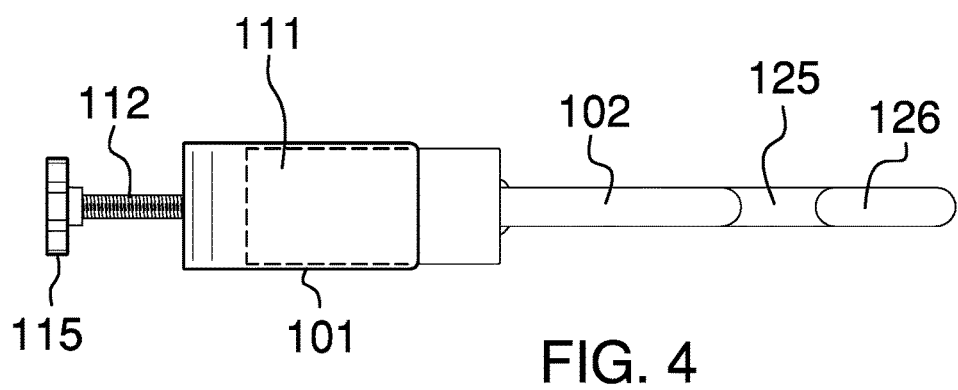
FIG. 4 is a top view of an embodiment of the disclosure.
Figure 5:
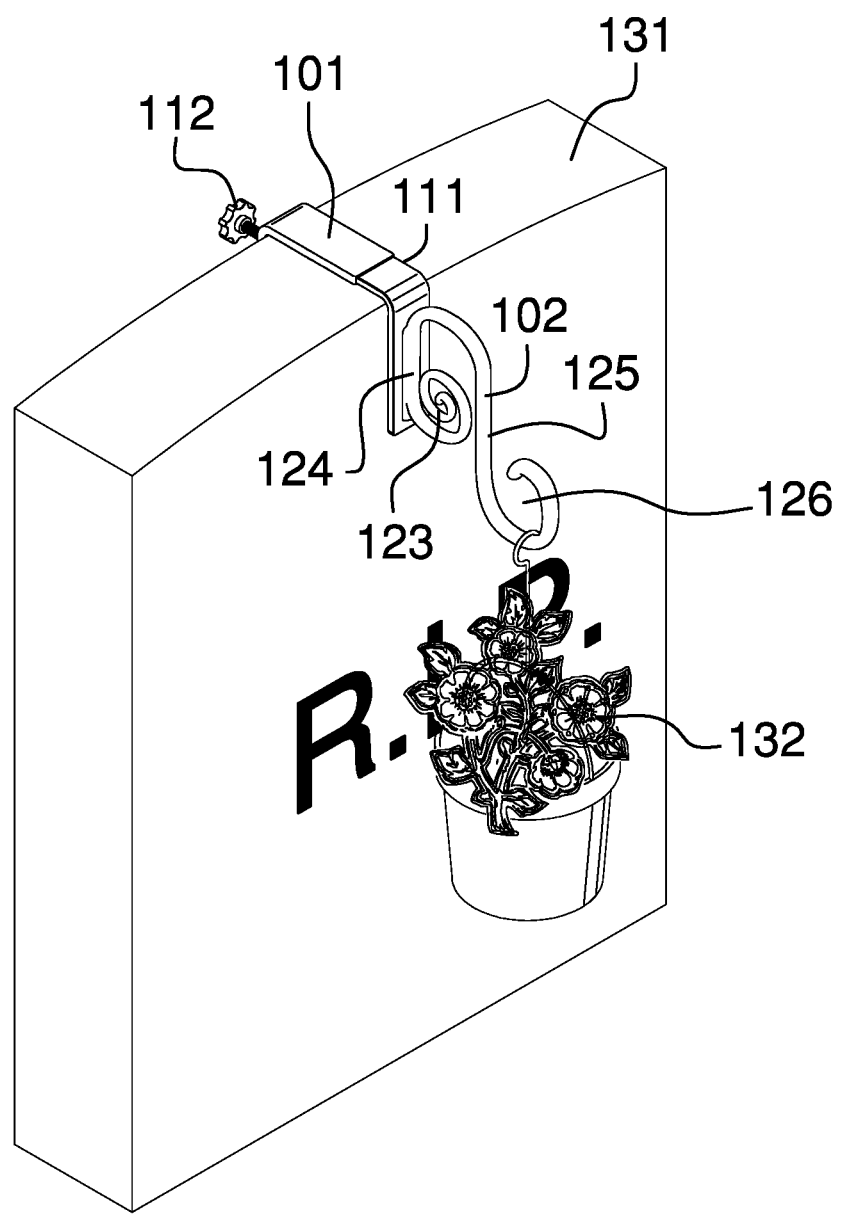
FIG. 5 is an in use view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The floral support device for a tombstone 100 (hereinafter invention) comprises a C clamp 101 and a hook 102. The hook 102 is attached to the C clamp 101. The C clamp 101 attaches to the tombstone 131. The invention 100 is adapted for use with a tombstone 131. The invention 100 is adapted for use with a floral arrangement 132. The invention 100 mounts directly on the tombstone 131. As used in this disclosure, a floral arrangement 132 includes, but is not limited to, a wreath. The floral arrangement 132 is hung from the invention 100.

The C clamp 101 is a readily and commercially available clamp that is used to attach the invention 100 to the tombstone. The C clamp 101 further comprises a C structure 111 and a clamp bolt 112. The C structure 111 is placed around the tombstone 131 and the clamp bolt 112 holds the C structure 111 securely to the tombstone 131. The C structure 111 further comprises a first arm 141, a second arm 142, and a back 143. As shown most clearly in FIG. 2, the back 143 attaches the first arm 141 and the second arm 142 together to create the characteristic shape of the letter "C." The first arm 141 and the second arm 142 form the top and the bottom of the C shape while the back 143 forms the left side of the C shape. The first arm 141 and the second arm 142 slip around the tombstone 131 while the invention 100 is in use. The clamp bolt 112 is attached to the C structure 111 using a threaded connection. The first arm 141 further comprises a threaded hole 144. The threaded hole 144 is a cylindrical aperture that is formed through the second arm 142 such that the center axis of the cylinder projects such that the center axis of the cylinder projects will intersect with the second arm 142. The threaded hole 144 is formed with an interior screw thread.

The clamp bolt 112 comprises a threaded shaft 113, a foot 114 and a hand grip 115. The threaded shaft 113 is further defined with a first end 116 and a second end 117. The threaded shaft 113 is a cylindrical shaft that is formed with an exterior screw thread 118 on its face. The outer diameter of the threaded shaft 113 is lesser than the inner diameter of the threaded hole 144 such that the threaded shaft 113 will fit within the threaded hole 144. The exterior screw thread 118 is formed such that the exterior screw thread 118 will properly screw into the interior screw thread. The hand grip 115 is a structure that is attached to the first end 116. The hand grip 115 is a disc shaped structure that acts as a handle that allows for hand tightening of the C clamp 101 to the tombstone 131 by rotating the clamp bolt 112. The foot 114 is a structure that shaped protective structure that is designed to distribute the force of the clamp bolt 112 against the tombstone 131 over a surface area that is larger than the surface area of the second end 117 of the threaded shaft 113.

The hook 102 is a structure that is attached to the C clamp 101 and upon which the floral arrangement 132 will be hung. The hook 102 further comprises a shaft 120, a first spiral 123, a welding surface 124, an S bridge 125, and a hook loop 126. The shaft 120 is further defined with a third end 121 and a fourth end 122. The shaft 120 is formed from a malleable material that is bent in a manner that forms the first spiral 123, the welding surface 124, the S bridge 125, and the hook loop 126.

As shown most clearly in FIG. 3, the shaft 120 of the hook 102 is bent or molded into a form that is now described in detail using a sense of direction along the shaft 120 from the third end 121 to the fourth end 122. The third end 121 forms the center of a first spiral 123 shape. The first spiral 123 is a decorative spiral shape. The portion of the first spiral 123 that is distal along the length of the shaft 120 from the third end 121 is attached to the welding surface 124. The welding surface 124 is straight portion of the shaft 120 that is attached to the second arm 142 of the C structure 111. The end of the welding surface 124 that is distal along the length of the shaft 120 from the third end 121 is attached to the S bridge 125. The S bridge 125 is an S shaped structure that is intended to span a distance away from the tombstone 131 such that the hook loop 126 will be separated in distance from the tombstone 131. While a straight cantilever would serve this purpose, the S shaped structure of the S bridge 125 provides a decorative element appropriate for the circumstances of the intended use. The end of the S bridge 125 that is distal along the length of the shaft 120 from the third end 121 is attached to the hook loop 126. The hook loop 126 is a U shaped structure that is formed with U shaped curvature such that a floral arrangement 132 can be hung from the hook loop 126. The end of the hook loop 126 that is distal along the length of the shaft 120 from the third end 121 is the fourth end 122.

To use the invention 100 the C structure 111 of the C clamp 101 is placed around the tombstone 131 and secured into position using the clamp bolt 112. A floral arrangement 132 is then hung from the hook 102.

In the first potential embodiment of the disclosure, the C Clamp 101 is formed from a metal and the hook 102 is formed from wrought iron. The C clamp 101 is readily and commercially available. The hook 102 is welded or brazed to the C clamp 101. In the second potential embodiment of the disclosure, the C structure 111 and the hook 102 is molded in plastic as a first molded in plastic as a second single unit. The foot 114 is molded in plastic as a third single unit. Suitable plastics include, but are not limited to high density polyethylene or acrylic poly(methyl methacrylic).

The following definitions were used in this disclosure:

Cantilever: As used in this disclosure, a cantilever is a beam or other structure that projects away from an object and is supported on only one end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or cone like structure. When the center axes of two cylinder or like structures share the same line they are said to be aligned. When the center axes of two cylinder like structures do not share the same line they are said to be offset.

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

Exterior Screw Thread: An exterior screw thread is a ridge wrapped around the outer surface of a tube in the form of a helical structure that is used to convert rotational movement into linear movement.

Hook: As used in this disclosure, a hook is an object that is curved or bent at an angle such that items can be hung on or caught by the object.

Inner Diameter: As used in this disclosure, the term inner diameter is used in the same way that a plumber would refer to the inner diameter of a pipe.

Interior Screw Thread: An interior screw thread is a form of a helical structure that is used to convert rotational movement into linear movement.

Locus: As used in this disclosure, a locus is a set of points that satisfy a specified condition, definition, or mathematical equation.

Loop: As used in this disclosure, a loop is the length of a first linear structure including, but not limited to, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook can be inserted through the space formed within the first linear structure. Within this disclosure, the first linear structure is said to be looped around the second linear structure.

Monotonically: As used in this disclosure, monotonically is used to describe an unchanging direction of change. Specifically, monotonically describes variation that: 1) will always increases and never decrease; or, 2) will always increase and never decrease.

Outer Diameter: As used in this disclosure, the term outer diameter is used in the same way that a plumber would refer to the outer diameter of a pipe.

Shaft: As used in this disclosure, the term shaft is used to describe a solid rigid cylindrical or tube like structure that is often used as the handle of a tool or implement.

Spiral: As used in this disclosure, a spiral describes a locus of points within a plane moving around a fixed center wherein the locus of points moves monotonically increasing manner away from the center.

Threaded Connection: As used in this disclosure, a threaded connection is a type of fastener that is used to join a first tube shaped and a second tube shaped object together. The first tube shaped object is fitted with fitted with a first fitting selected from an interior screw thread or an exterior screw thread. The second tube shaped object is fitted with the remaining screw thread. The tube shaped object fitted with the exterior screw thread is placed into the remaining tube shaped object such that: 1) the interior screw thread and the exterior screw thread interconnect; and, 2) when the tube shaped object fitted with the exterior screw thread is rotated the rotational motion is converted into linear motion that moves the tube shaped object fitted with the exterior screw thread either into or out of the remaining tube shaped object. The direction of linear motion is determined by the direction of rotation.

Wrought Iron: As used in this disclosure, wrought iron refers to a malleable and ductile iron or steel that can be readily formed into decorative shapes.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A floral support device comprising:
a C clamp and a hook;
wherein the floral support device is adapted for use with a tombstone;
wherein the hook is attached to the C clamp;
wherein the C clamp attaches to the tombstone;
wherein the floral support device is adapted for use with a floral arrangement;
wherein the floral arrangement is hung from the floral support device;
wherein the C clamp comprises a C structure and a clamp bolt;
wherein the C structure is placed around the tombstone and the clamp bolt holds the C structure securely to the tombstone;
wherein the C structure further comprises a first arm, a second arm, and a back;
wherein the back attaches the first arm to the second arm;
wherein the first arm and the second arm fit around the tombstone;
wherein the clamp bolt is attached to the C structure using a threaded connection;
wherein the first arm further comprises a threaded hole;
wherein the threaded hole is a cylindrical aperture that is formed through the second arm such that the center axis of the cylinder will intersect with the second arm;
wherein the threaded hole is formed with an interior screw thread;
wherein the clamp bolt comprises a threaded shaft, a foot and a hand grip;
wherein the threaded shaft is further defined with a first end and a second end;
wherein the threaded shaft is a cylindrical shaft that is formed with an exterior screw thread on its face;
wherein the outer diameter of the threaded shaft is lesser than the inner diameter of the threaded hole such that the threaded shaft will fit within the threaded hole;
wherein the exterior screw thread is formed such that the exterior screw thread will screw into the interior screw thread;
wherein the hand grip is a disk shaped structure;
wherein the hand grip is attached to the first end;
wherein the foot is a disk shaped structure that is designed to distribute the force of the clamp bolt against the tombstone over a surface area that is larger than the surface area of the second end of the threaded shaft;
wherein the foot is attached to the second end.

2. The floral support device according to claim 1
wherein the hook further comprises a shaft, a first spiral, a welding surface, an S bridge, and a hook loop;
wherein the shaft is further defined with a third end and a fourth end;
wherein the shaft forms the first spiral, the welding surface, the S bridge, and the hook loop.

3. The floral support device according to claim 2
wherein the first spiral is formed in a spiral shape;
wherein the third end forms the center of the first spiral shape.

4. The floral support device according to claim 3
wherein the portion of the first spiral that is distal along the length of the shaft from the third end is attached to the welding surface;
wherein the welding surface is straight section of the shaft that is attached to the second arm of the C structure.

5. The floral support device according to claim 4
wherein the end of the welding surface that is distal along the length of the shaft from the third end is attached to the S bridge;
wherein the S bridge is a non-linear cantilever that projects away from the tombstone.

6. The floral support device according to claim 5
wherein the end of the S bridge that is distal along the length of the shaft from the third end is attached to the hook loop;
wherein the hook loop is a structure that is formed with a curvature such that a floral arrangement can be hung from the hook loop;
wherein the end of the hook loop that is distal along the length of the shaft from the third end is the fourth end.

7. The floral support device according to claim 6
wherein the C structure and the hook are molded in a first plastic material as a first single unit;
wherein the threaded shaft and the hand grip are molded as a second single unit using the first plastic material;
wherein the foot is molded in plastic as a third single unit using the first plastic material.

\* \* \* \* \*